(12) United States Patent
Cho et al.

(10) Patent No.: US 12,087,941 B2
(45) Date of Patent: Sep. 10, 2024

(54) LITHIUM SECONDARY BATTERY

(71) Applicant: LG ENERGY SOLUTION, LTD., Seoul (KR)

(72) Inventors: Eunkyung Cho, Daejeon (KR); Intae Park, Daejeon (KR); Myeongjun Song, Daejeon (KR); Ilto Kim, Daejeon (KR); Hyunah Cho, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 587 days.

(21) Appl. No.: 17/292,793

(22) PCT Filed: Jan. 16, 2020

(86) PCT No.: PCT/KR2020/000792
§ 371 (c)(1),
(2) Date: May 11, 2021

(87) PCT Pub. No.: WO2020/149659
PCT Pub. Date: Jul. 23, 2020

(65) Prior Publication Data
US 2021/0399294 A1    Dec. 23, 2021

(30) Foreign Application Priority Data

Jan. 16, 2019   (KR) .................. 10-2019-0005836
Mar. 15, 2019   (KR) .................. 10-2019-0029622
(Continued)

(51) Int. Cl.
*H01M 4/00*    (2006.01)
*H01M 4/36*    (2006.01)
(Continued)

(52) U.S. Cl.
CPC ............ *H01M 4/38* (2013.01); *H01M 4/362* (2013.01); *H01M 4/625* (2013.01);
(Continued)

(58) Field of Classification Search
CPC ........ H01M 4/38; H01M 4/362; H01M 4/625; H01M 10/0525; H01M 2004/021;
(Continued)

(56) References Cited

U.S. PATENT DOCUMENTS 6,194,099 B1 *   2/2001   Gernov ............... H01M 4/625
                                                          29/623.5
2003/0073005 A1   4/2003   Kim et al.
(Continued)

FOREIGN PATENT DOCUMENTS

CN      103474633 A    12/2013
CN      108455562 A    8/2018
(Continued)

OTHER PUBLICATIONS

Cuisinier et al., "Unique behaviour of nonsolvents for polysulphides in lithium-sulphur batteries," Energy & Environmental Science, vol. 7, 2014, pp. 2697-2705, 9 pages total.
(Continued)

*Primary Examiner* — Nicholas P D'Aniello
(74) *Attorney, Agent, or Firm* — Birch, Stewart, Kolasch & Birch, LLP

(57) ABSTRACT

A lithium secondary battery, specifically, a lithium secondary battery. By specifically adjusting the porosity (%) and the mass of sulfur per unit area (mg/cm$^2$) of a positive electrode active material layer including a sulfur-carbon composite, the initial battery discharge capacity is improved, and thus a high energy density can be achieved.

11 Claims, 1 Drawing Sheet

(30) Foreign Application Priority Data

Jan. 16, 2020 (KR) .................. 10-2020-0005813
Jan. 16, 2020 (KR) .................. 10-2020-0005869

(51) Int. Cl.

| | | |
|---|---|---|
| H01M 4/38 | (2006.01) | |
| H01M 4/62 | (2006.01) | |
| H01M 10/0525 | (2010.01) | |
| H01M 4/02 | (2006.01) | |

(52) U.S. Cl.

CPC .. H01M 10/0525 (2013.01); *H01M 2004/021* (2013.01); *H01M 2004/028* (2013.01); *H01M 2220/20* (2013.01); *H01M 2300/0037* (2013.01)

(58) Field of Classification Search

CPC ....... H01M 2004/028; H01M 2220/20; H01M 2300/0037; H01M 2300/0034; H01M 4/13; H01M 4/139; H01M 4/382; H01M 10/0569; H01M 10/052; Y02E 60/10
See application file for complete search history.

(56) References Cited

U.S. PATENT DOCUMENTS

| | | | |
|---|---|---|---|
| 2013/0040185 | A1 | 2/2013 | Takase |
| 2013/0280600 | A1 | 10/2013 | Uehara et al. |
| 2013/0337347 | A1* | 12/2013 | Pol .................. H01M 4/583 568/18 |
| 2014/0322618 | A1 | 10/2014 | Braun |
| 2015/0140446 | A1 | 5/2015 | Li |
| 2016/0248087 | A1* | 8/2016 | Kim .................. H01M 4/625 |
| 2016/0344063 | A1 | 11/2016 | Chang et al. |
| 2017/0098858 | A1 | 4/2017 | Kim et al. |
| 2017/0352920 | A1 | 12/2017 | Kawai et al. |
| 2018/0062206 | A1 | 3/2018 | Yang et al. |
| 2018/0138503 | A1 | 5/2018 | Kim et al. |
| 2018/0248227 | A1 | 8/2018 | Park et al. |
| 2018/0301739 | A1 | 10/2018 | Park et al. |
| 2018/0375088 | A1 | 12/2018 | Kim et al. |
| 2019/0123377 | A1 | 4/2019 | Yang et al. |
| 2020/0036043 | A1 | 1/2020 | Ishikawa et al. |
| 2021/0104745 | A1 | 4/2021 | Park et al. |
| 2021/0328209 | A1 | 10/2021 | Lee et al. |

FOREIGN PATENT DOCUMENTS

| | | |
|---|---|---|
| CN | 108602674 A | 9/2018 |
| CN | 111837260 A | 10/2020 |
| CN | 112585782 A | 3/2021 |
| EP | 3 480 881 A1 | 5/2019 |
| EP | 3 751 640 A1 | 12/2020 |
| JP | 2015-505825 A | 2/2015 |
| JP | 2016-119165 A | 6/2016 |
| JP | 2017-178859 A | 10/2017 |
| JP | 2021-534563 A | 12/2021 |
| JP | 7065990 B2 | 5/2022 |
| KR | 10-0354229 B1 | 9/2002 |
| KR | 10-0441514 B1 | 7/2004 |
| KR | 10-2010-0113553 A | 10/2010 |
| KR | 10-2013-0018511 A | 2/2013 |
| KR | 10-1379716 B1 | 3/2014 |
| KR | 10-1513552 B1 | 4/2015 |
| KR | 10-2015-0088913 A | 8/2015 |
| KR | 10-2016-0031284 A | 3/2016 |
| KR | 10-2016-0037084 A | 4/2016 |
| KR | 10-1614613 B1 | 4/2016 |
| KR | 10-2016-0086838 A | 7/2016 |
| KR | 10-2016-0136686 A | 11/2016 |
| KR | 10-2017-0032190 A | 3/2017 |
| KR | 10-2017-0039580 A | 4/2017 |
| KR | 10-1728828 B1 | 4/2017 |
| KR | 10-2017-0061692 A | 6/2017 |
| KR | 10-2017-0075969 A | 7/2017 |
| KR | 10-2017-0092455 A | 8/2017 |
| KR | 10-2017-0121047 A | 11/2017 |
| KR | 10-2017-0136971 A | 12/2017 |
| KR | 10-2018-0017654 A | 2/2018 |
| KR | 10-2018-0102406 A | 9/2018 |
| KR | 10-2014-0140716 A | 8/2024 |
| WO | WO 2009/089018 A2 | 7/2009 |
| WO | WO 2018/007665 A1 | 1/2018 |
| WO | WO 2018/163778 A1 | 9/2018 |
| WO | WO 2018/164413 A1 | 9/2018 |

OTHER PUBLICATIONS

Extended European Search Report for European Application No. 20741071.3, dated Nov. 12, 2021.

Flamme et al., "Guidelines to Design Organic Electrolytes for Lithium-ion Batteries: Environmental Impact, Physicochemical and Electrochemical Properties", Green Chemistry, 2017, vol. 19, No. 8, pp. 1828-1849, Total 22 pages.

Fotouhi et al., "Lithium-Sulfur Battery Technology Readiness and Applications—A Review", Energies 2017, vol. 10, No. 12, 1937, pp. 1-15.

International Search Report (PCT/ISA/210) issued in PCT/KR2020/000792 mailed on Apr. 29, 2020.

Yang et al., "Structural Design of Lithium-Sulfur Batteries: From Fundamental Research to Practical Application", Electrochemical Energy Reviews, 2018, vol. 1, pp. 239-293.

Zeng et al., "A Safer Sodium-Ion Battery Based on Nonflammable Organic Phosphate Electrolyte", Advanced Science, 2016, vol. 3, No. 9, 1600066, pp. 1-8.

* cited by examiner

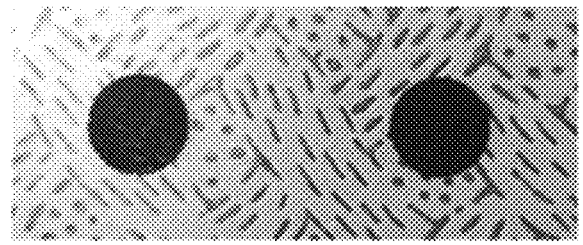
Before Rolling    After Rolling

LITHIUM SECONDARY BATTERY

TECHNICAL FIELD

The present application claims priority to and the benefits of Korean Patent Application No. 10-2019-0005836 filed on Jan. 16, 2019, Korean Patent Application No. 10-2019-0029622 filed on Mar. 15, 2019, Korean Patent Application No. 10-2020-0005813 filed on Jan. 16, 2020, and Korean Patent Application No. 10-2020-0005869 filed on Jan. 16, 2020, the entire contents of which are incorporated herein by reference.

The present invention relates to a lithium secondary battery.

BACKGROUND ART

As application areas of secondary batteries expand to electric vehicles (EV), energy storage systems (ESS) or the like, lithium-ion secondary batteries having relatively low weight to energy storage density (~250 Wh/kg) have limits in applications for such products. On the other hand, a lithium-sulfur secondary battery is capable of accomplishing high weight to energy storage density (2,600 Wh/kg) theoretically, and thereby has received attention as a next generation secondary battery technology.

A lithium-sulfur secondary battery is a battery system using a sulfur series material having a sulfur-sulfur bond as a positive electrode active material, and lithium metal as a negative electrode active material. Such a lithium-sulfur secondary battery has advantages in that sulfur, a main material of the positive electrode active material, is very abundant in resources globally, has no toxicity and has a low atomic weight.

During discharge of a lithium-sulfur secondary battery, lithium, a negative electrode active material, is oxidized while releasing electrons and being ionized, and a sulfur series material, a positive electrode active material, is reduced by receiving the electrons. Herein, the oxidation reaction of lithium is a process in which lithium metal releases electrons and changes into a lithium cation form. In addition, the reduction reaction of sulfur is a process in which a sulfur-sulfur bond receives two electrons and changes into a sulfur anion form. The lithium cation produced through the oxidation reaction of lithium is transferred to a positive electrode through an electrolyte, and forms a salt by bonding with the sulfur anion produced through the reduction reaction of sulfur. Specifically, sulfur before discharge has a cyclic $S_8$ structure, and this changes to lithium polysulfide ($Li_2S_x$, x=8, 6, 4, 2) through the reduction reaction, and when such lithium polysulfide is fully reduced, lithium sulfide ($Li_2S$) is eventually produced.

Due to low electric conductivity of sulfur, a positive electrode active material, reactivity with electrons and lithium ions is difficult to secure in a solid-state form. In order to improve such reactivity of sulfur, existing lithium-sulfur secondary batteries produce intermediate polysulfide in a $Li_2S_x$ form to induce a liquid-state reaction and improve reactivity. Herein, an ether-based solvent such as dioxolane or dimethoxyethane having high solubility for lithium polysulfide is used as a solvent of an electrolyte liquid. In addition, existing lithium-sulfur secondary batteries build a catholyte-type lithium-sulfur secondary battery system to improve reactivity, and in this case, sulfur reactivity and lifetime properties are affected by the electrolyte liquid content due to properties of lithium polysulfide readily dissolved in the electrolyte liquid. In addition, a low content electrolyte liquid needs to be injected in order to build high energy density, however, a lithium polysulfide concentration increases in the electrolyte liquid as the electrolyte liquid decreases making normal battery driving difficult due to a decrease in the active material mobility and an increase in the side reaction.

Such lithium polysulfide elution adversely affects battery capacity and lifetime properties, and various technologies for suppressing lithium polysulfide elution have been proposed.

As one example, Korean Patent Application Laid-Open Publication No. 2016-0037084 discloses that using a carbon nanotube aggregate having a three-dimensional structure coated with graphene as a carbon material may prevent lithium polysulfide from melting, and enhance conductivity of a sulfur-carbon nanotube composite.

In addition, Korean Patent No. 1379716 discloses that, by using a sulfur-including graphene composite, which is prepared through a method of treating graphene with hydrofluoric acid to form a pore on the graphene surface, and growing sulfur particles in the pore, as a positive electrode active material, lithium polysulfide elution is suppressed and as a result, a decrease in the battery capacity may be minimized.

By varying structures or materials of a sulfur-carbon composite used as a positive electrode active material, these patents have somewhat improved a problem of performance decline in a lithium-sulfur secondary battery through preventing lithium polysulfide elution, however, the effects are not sufficient. Accordingly, in order to build a lithium-sulfur secondary battery with high energy density, a battery system capable of driving a high loading and low porosity electrode is required, and studies on such a battery system have been continuously conducted in the art.

PRIOR ART DOCUMENTS

Patent Documents (Patent Document 1) Korean Patent Application Publication No. 2016-0037084 (2016.04.05.)
(Patent Document 2) Korean Patent No. 1379716 (2014.03.25.)
(Patent Document 3) Korean Patent Application Publication No. 2018-0017654 (2018.02.21.)

Non-Patent Documents (Non-Patent Document 1) Abbas Fotouhi et al., Lithium-Sulfur Battery Technology Readiness and Applications—A Review, Energies 2017, 10, 1937.

DISCLOSURE

Technical Problem

As a result of extensive studies in view of the above, the inventors of the present invention have identified that, by specifically adjusting porosity (%) and a mass of sulfur per unit area ($mg/cm^2$) of a positive electrode active material layer including a sulfur-carbon composite (SC factor and ED factor), a lithium secondary battery having high energy density may be obtained, and have completed the present invention.

In addition, the inventors of the present invention have identified that, when, together with the constitution of specifically adjusting porosity (%) and a mass of sulfur per unit area (mg/cm²) of a positive electrode active material layer (SC factor and ED factor), using a positive electrode active material layer including a sulfur-carbon composite in which a relation between a specific surface area and conductivity of a carbon material satisfies a specific condition (AC factor), a lithium-sulfur secondary battery having excellent initial discharge capacity and having high energy density may be obtained, and have completed the present invention.

In addition, the inventors of the present invention have identified that the lithium secondary battery exhibits high energy density by using, together with the constitution of specifically adjusting porosity (%) and a mass of sulfur per unit area (mg/cm²) of a positive electrode active material layer (SC factor and ED factor), a positive electrode including a sulfur-carbon composite prepared from a dot-type carbon material with a nanoparticle shape and an electrolyte liquid including a solvent having high dipole moment and low viscosity (DV² factor).

Accordingly, an aspect of the present invention provides a lithium secondary battery having excellent initial discharge capacity, and also having excellent energy density.

Technical Solution

According to an aspect of the present invention, there is provided a lithium secondary battery including a positive electrode; a negative electrode; a separator; and an electrolyte liquid, wherein an ED factor value represented by the following Mathematical Formula 1 is 850 or greater:

$$ED \text{ factor} = V \times SC \text{ factor} \times \frac{C}{D} \quad \text{[Mathematical Formula 1]}$$

in Mathematical Formula 1, V is a discharge nominal voltage (V) for Li/Li⁺, D is density (g/cm³) of the electrolyte liquid, C is discharge capacity (mAh/g) when discharging at a 0.1 C rate, and the SC factor represented by the following Mathematical Formula 2 is 0.45 or greater:

$$SC \text{ factor} = \alpha \times \frac{L}{P} \quad \text{[Mathematical Formula 2]}$$

in Mathematical Formula 2, P is porosity (%) of a positive electrode active material layer in the positive electrode, L is a mass of sulfur per unit area (mg/cm²) of the positive electrode active material layer in the positive electrode, and α is 10 (constant).

In one embodiment of the present invention, the positive electrode includes a sulfur-carbon composite including a carbon material satisfying a condition of an AC factor represented by the following Mathematical Formula 3 being 100 or greater:

AC factor=0.1×specific area(m²/g)+2×conductivity(S/cm@2000 kgf)    [Mathematical Formula 3]

in Mathematical Formula 3, specific area is a specific surface area of the carbon material, and conductivity is electrical conductivity obtained by converting a powder resistance value measured while applying a pressure of 2000 kgf to the carbon material to conductivity.

In one embodiment of the present invention, the electrolyte liquid includes a solvent and a lithium salt, and the solvent includes a first solvent in which a DV² factor value represented by the following Mathematical Formula 4 is 1.75 or less and a second solvent that is a fluorinated ether-based solvent:

$$DV^2 \text{ factor} = \gamma \times \frac{\mu}{DV} \quad \text{[Mathematical Formula 4]}$$

in Mathematical Formula 4,
DV is a dipole moment per unit volume (D·mol/L),
μ is viscosity of the solvent (cP, 25° C.), and
γ is 100 (constant).

In the lithium secondary battery in one embodiment of the present invention, an NS factor value represented by the following Mathematical Formula 5 is 3.5 or less:

$$NS \text{ factor} = \frac{DV^2 \text{ factor}}{SC \text{ factor}} \quad \text{[Mathematical Formula 5]}$$

in Mathematical Formula 5,
the SC factor has the same value as defined in Mathematical Formula 2, and
the DV² factor has the same value as defined in Mathematical Formula 4.

Advantageous Effects

By a lithium-sulfur secondary battery according to the present invention using a positive electrode active material layer including a sulfur-carbon composite in which a relation between a specific surface area and conductivity of a carbon material satisfies a specific condition (AC factor), and specifically adjusting porosity (%) and a mass of sulfur per unit area (mg/cm²) of the positive electrode active material layer, effects of providing excellent initial discharge capacity and obtaining high energy density are provided.

In addition, by the lithium secondary battery using a sulfur-carbon composite prepared from a dot-type carbon material with a nanoparticle shapedot-type carbon material as a positive electrode material, detachment caused by a rolling process may not occur when preparing a positive electrode.

In addition, by forming a battery so that, together with the constitutions, an electrolyte liquid includes a first solvent satisfying a specific condition (DV² factor) and a second solvent that is a fluorinated ether-based solvent, an effect of obtaining high energy density is provided.

DESCRIPTION OF DRAWING

The FIGURE shows an image of a positive electrode before and after rolling when preparing the positive electrode in Example 5.

BEST MODE

Hereinafter, the present invention will be described in more detail.

Terms or words used in the present specification and the claims are not to be interpreted limitedly to common or dictionary meanings, and shall be interpreted as meanings and concepts corresponding to technological ideas of the present disclosure based on a principle in which the inventors may suitably define the concepts of terms in order to describe the invention in the best possible way.

Terms used in the present invention are for describing specific embodiments only and do not intend to limit the present inventive. Singular forms used herein include plural forms as well, unless the context clearly indicates otherwise. In the present invention, terms such as 'include' or 'have' are to specify the presence of features, numbers, steps, behaviors, constituents, components or combinations thereof described in the specification, and need to be construed as not excluding the possibility of presence or addition of one or more of other features, numbers, steps, behaviors, constituents, components or combinations thereof in advance.

The term "composite" used in the present specification means a material combining two or more materials, and exhibiting more effective functions while forming physically and chemically different phases.

The term "lithium secondary battery" used in the present specification means a lithium-sulfur secondary battery including a sulfur-carbon composite as a positive electrode active material.

A lithium-sulfur secondary battery has high discharge capacity and energy density among various lithium secondary batteries, and has received attention as a next-generation secondary battery with an advantage of sulfur used as a positive electrode active material being abundant in resources and low-priced lowering manufacturing costs of the battery, and being environmental-friendly.

However, in existing lithium-sulfur secondary battery systems, lithium polysulfide elution is not able to be suppressed causing sulfur loss, and as a result, theoretical discharge capacity and theoretical energy density are not fully obtained in actual driving since the amount of sulfur participating in an electrochemical reaction rapidly decreases.

As a result of extensive studies, the inventors of the present invention have identified that, in a lithium-sulfur secondary battery including a positive electrode, a negative electrode, a separator and an electrolyte liquid, initial discharge capacity of the battery may be enhanced, and a lithium-sulfur secondary battery having high energy density may also be obtained when using a sulfur-carbon composite in which a relation between a specific surface area and conductivity of a carbon material satisfies a specific condition (AC factor) as a positive electrode active material, and specifically adjusting porosity (%) and a mass of sulfur per unit area (mg/cm$^2$) of the positive electrode active material layer, and have completed the present invention.

In addition, the inventors of the present invention have identified that, together with the constitution, the effects as above may be more enhanced by adjusting the electrolyte liquid to satisfy a specific condition.

The present invention relates to a lithium secondary battery including a positive electrode; a negative electrode; a separator; and an electrolyte liquid, wherein an ED factor value represented by the following Mathematical Formula 1 is 850 or greater:

$$ED \text{ factor} = V \times SC \text{ factor} \times \frac{C}{D} \quad \text{[Mathematical Formula 1]}$$

in Mathematical Formula 1, V is a discharge nominal voltage (V) for Li/Li$^+$, D is density (g/cm$^3$) of the electrolyte liquid, C is discharge capacity (mAh/g) when discharging at a 0.1 C rate, and the SC factor represented by the following Mathematical Formula 2 is 0.45 or greater:

$$SC \text{ factor} = \alpha \times \frac{L}{P} \quad \text{[Mathematical Formula 2]}$$

in Mathematical Formula 2, P is porosity (%) of a positive electrode active material layer in the positive electrode, L is a mass of sulfur per unit area (mg/cm$^2$) of the positive electrode active material layer in the positive electrode, and a is 10 (constant).

The ED factor may accomplish high energy density in an actual lithium-sulfur secondary battery as the value is higher. According to the present invention, the ED factor value may be 850 or greater, preferably 870 or greater, and more preferably 891 or greater. Although an upper limit of the ED factor value is not particularly limited in the present invention, the ED factor value may be 10,000 or less when considering actual driving of the lithium-sulfur secondary battery. The ED factor value range means that the lithium-sulfur secondary battery according to the present invention is capable of obtaining more enhanced energy density compared to existing lithium-sulfur secondary batteries.

The lithium-sulfur secondary battery according to the present invention accomplishes high energy density by an organic binding of, as well as the positive electrode described above, a negative electrode, a separator, an electrolyte and the like, and according to the present invention, in order for the lithium-sulfur secondary battery to accomplish high energy density, the SC factor value may be 0.45 or greater and preferably 0.5 or greater. Although an upper limit of the SC factor value is not particularly limited in the present invention, the SC factor value may be 4.5 or less when considering actual driving of the lithium-sulfur secondary battery. In existing lithium-sulfur secondary batteries, performance such as energy density of the battery declines when the SC factor value is 0.45 or greater, however, in the lithium-sulfur secondary battery according to the present invention, battery performance is maintained without declining in actual driving.

The positive electrode according to the present invention may include a sulfur-carbon composite including a carbon material satisfying a condition of an AC factor represented by the following Mathematical Formula 3 being 100 or higher:

$$AC \text{ factor}=0.1\times\text{specific area(m}^2\text{/g)}+2\times\text{conductivity(S/cm@2000 kgf)} \quad \text{[Mathematical Formula 3]}$$

in Mathematical Formula 3, specific area is a specific surface area of the carbon material, and conductivity is electrical conductivity obtained by converting a powder resistance value measured while applying a pressure of 2000 kgf to the carbon material to conductivity.

When satisfying a condition of the AC factor represented by Mathematical Formula 1 being 100 or greater, initial discharge capacity of a battery may be enhanced, and as a result, a lithium-sulfur secondary battery having high energy density may be obtained.

The upper limit of the AC factor is not particularly limited, however, considering properties of an actual carbon material, the AC factor value may be preferably 1,000 or less.

In the present invention, the carbon material has a specific surface area of preferably 100 m$^2$/g to 4500 m$^2$/g, and more preferably 250 m$^2$/g to 4000 m$^2$/g. Herein, the specific surface area may be measured through a common BET method. The specific surface area of the carbon material being less than the above-mentioned range has a problem of a decrease in the reactivity due to a decrease in the contact area with the sulfur, and the specific surface area being greater than the above-mentioned range on the contrary may have problems of an increase in the side reaction caused by the excessive specific surface area and an increase in the added binder amount required for preparing positive electrode slurry.

The carbon material has a pore volume of preferably 0.8 cm$^3$/g to 5 cm$^3$/g, and more preferably 1 cm$^3$/g to 4.5 cm$^3$/g. Herein, the pore volume may be measured through a common BET method. When the pore volume of the carbon material is less than the above-mentioned range, sulfur is not favorably impregnated into the pore structure, and the pore volume being greater than the above-mentioned range on the contrary may have a problem of increasing electrode porosity, which leads to an increase in the electrolyte liquid amount required to fill the pores making it difficult to accomplish high energy density.

In the present invention, electrical conductivity obtained by converting a powder resistance value measured while applying a pressure of 2000 kgf to the carbon material to conductivity is preferably from 10 S/cm to 100 S/cm, and more preferably from 20 S/cm to 100 S/cm. Having electrical conductivity in less than the above-mentioned range is not preferred since there is a limitation in electron migration causing a disadvantage of reducing efficiency during charge and discharge.

In the present invention, the carbon material may include one or more types selected from the group consisting of graphite, carbon nanotubes, graphene, amorphous carbon, carbon black and activated carbon, but is not limited thereto.

In the sulfur-carbon composite of the present invention, the carbon material may be included in 10% by weight to 50% by weight, and preferably in 20% by weight to 40% by weight based on the total weight of the sulfur-carbon composite.

As the sulfur, one or more types selected from the group consisting of inorganic sulfur, Li$_2$S$_n$ (n≥1), a disulfide compound, an organosulfur compound and a carbon-sulfur polymer may be used.

The sulfur may be included in 50% by weight to 90% by weight, and more preferably in 60% by weight to 80% by weight based on the total weight of the sulfur-carbon composite. When the sulfur is included in less than 50% by weight, the mass of sulfur per unit area (mg/cm$^2$) (L) of the positive electrode active material layer is insufficient making it difficult to satisfy the SC factor, and when included in greater than 90% by weight, the sulfur is not uniformly impregnated into pores and surface of the carbon material and aggregates separately instead, which may cause a problem of significantly reducing conductivity of the sulfur-carbon composite.

In addition, a weight ratio of the carbon material and the sulfur may be from 1:1 to 1:9 and preferably from 1:1.5 to 1:4 in the sulfur-carbon composite. When the weight ratio is less than the above-mentioned range, an added binder amount required for preparing positive electrode slurry increases as the porous carbon material content increases. Such an increase in the added binder amount resultantly increases sheet resistance of an electrode performing a role of an insulator preventing electron migration (electron pass), and cell performance may decline therefrom. On the contrary, when the weight ratio is greater than the above-mentioned range, sulfurs aggregate by themselves, and direct participation in an electrode reaction may become difficult since the sulfur is difficult to receive electrons.

The sulfur-carbon composite may be composited by simply mixing the sulfur and the carbon material described above, or may have a core-shell structured coating form or a supported form. The core-shell structured coating form means any one of the sulfur or the microporous carbon material coating the other material, and may be, for example, the carbon material surface being covered by the sulfur or vice versa. In addition, the supported form may be a form of supporting sulfur inside the carbon. The sulfur-carbon composite may have any form as long as it satisfies the content ratio of the sulfur and the carbon material provided above, and the form is not limited in the present invention.

In the present invention, the sulfur-carbon composite may have a specific surface area of preferably 3 m$^2$/g to 20 m$^2$/g, and more preferably 5.5 m$^2$/g to 15 m$^2$/g. The sulfur-carbon composite having a specific surface area of less than 3 m$^2$/g is not preferred in that the sulfur is not evenly impregnated into the carbon material surface causing decline in the cell performance, and the specific surface area being greater than 20 m$^2$/g is not preferred in terms of increasing an added binder amount required for electrode preparation.

In the present invention, the sulfur-carbon composite has a pore volume of preferably 0.075 cm$^3$/g to 1.000 cm$^3$/g and more preferably 0.080 cm$^3$/g to 1.000 cm$^3$/g. The sulfur-carbon composite having a pore volume of less than 0.075 cm$^3$/g is not preferred in terms that the sulfur is present separately on the surface or aggregates instead of being impregnated into the sulfur-carbon composite, and the pore volume being greater than 1.000 cm$^3$/g is not preferred in terms that preparation of a high energy density electrode is difficult since the sulfur does not use pores of the sulfur-composite even when there is much space for the sulfur to be impregnated.

In the present invention, the carbon material may be a dot-type carbon material, and the dot-type carbon material may mean a nanoparticle-type carbon material. The dot-type carbon material may also be referred to as an O dimension (OD) particle-type carbon material.

The dot-type carbon material may include one or more types of carbon black-based carbon materials selected from the group consisting of carbon black, ketjen black, denka black, acetylene black, channel black, furnace black, lamp black and thermal black, and may preferably include ketjen black.

In addition, the dot-type carbon material may have a primary particle diameter of 5 nm to 100 nm, preferably 10 nm to 90 nm, and more preferably 15 nm to 80 nm. When the particle diameter is less than the above-mentioned range, positive electrode durability may decrease, and when the particle diameter is greater than the above-mentioned range, positive electrode reactivity may decrease. Herein, the primary particle means a particle in a state where the dot-type carbon material particles do not aggregate each other.

In addition, the dot-type carbon material may have a specific surface area of 500 m$^2$/g to 2000 m$^2$/g, preferably 600 m$^2$/g to 1900 m$^2$/g, and more preferably 700 m$^2$/g to 1800 m$^2$/g. When the specific surface area is less than the above-mentioned range, uniform sulfur loading is difficult causing a decrease in the reactivity of a secondary battery, and when the specific surface area is greater than the above-mentioned range, positive electrode durability may decrease.

In addition, the dot-type carbon material may have a pore volume of 1 cm$^3$/g to 1.3 cm$^3$/g, preferably 1.1 cm$^3$/g to 1.3 cm$^3$/g, and more preferably 1.2 cm$^3$/g to 1.3 cm$^3$/g. When the pore volume is less than the above-mentioned range, maintaining a conductive structure and securing a lithium ion path may be difficult, and when the pore volume is greater than the above-mentioned range, positive electrode durability may decrease.

The positive electrode according to the present invention may include a positive electrode current collector, and a positive electrode active material layer coated on one surface or both surfaces of the positive electrode current collector.

As the positive electrode active material, the sulfur-carbon composite described above is used.

The positive electrode current collector is not particularly limited as long as it supports a positive electrode active material, and has high conductivity without inducing chemical changes to the corresponding battery. For example, copper, stainless steel, aluminum, nickel, titanium, palladium, baked carbon, copper or stainless steel of which surface is treated with carbon, nickel, silver or the like, aluminum-cadmium alloys and the like may be used.

The positive electrode current collector may strengthen binding strength with the positive electrode active material by forming micro unevenness on a surface thereof, and various forms such as films, sheets, foil, meshes, nets, porous bodies, foams or non-woven fabrics may be used.

The thickness of the positive electrode current collector is not particularly limited, but may be, for example, from 3 µm to 500 µm.

The positive electrode active material layer may include a positive electrode active material, and selectively, one or more types of a conductor and a binder.

An average diameter of the sulfur-carbon composite is not particularly limited in the present invention and may vary, but may be preferably from 0.1 µm to 100 µm, and preferably from 1 µm to 50 µm. Satisfying the above-mentioned range has an advantage of preparing a high loading electrode.

The positive electrode active material may further include, in addition to the above-described composition, one or more additives selected from among transition metal elements, group IIIA elements, group IVA elements, sulfur compounds of these elements, and alloys of these elements and sulfur.

As the transition metal element, Sc, Ti, V, Cr, Mn, Fe, Co, Ni, Cu, Zn, Y, Zr, Nb, Mo, Tc, Ru, Rh, Pd, Os, Ir, Pt, Au, Hg or the like may be included. As the group IIIA element, Al, Ga, In, Ti or the like may be included, and as the group IVA element, Ge, Sn, Pb or the like may be included.

The conductor is a material connecting an electrolyte and a positive electrode active material to perform a role of a path through which electrons migrate from a current collector to the positive electrode active material, and materials having conductivity may be used without limit.

For example, as the conductor, carbon black such as Super-P, denka black, acetylene black, ketjen black, channel black, furnace black, lamp black, thermal black or carbon black; carbon derivatives such as carbon nanotubes or fullerene; conductive fibers such as carbon fiber or metal fibers; fluorocarbon; aluminum and metal powders such as nickel powder; or conductive polymers such as polyaniline, polythiophene, polyacetylene or polypyrrole may be used either alone or as a mixture.

The conductor may be added in 0.01% by weight to 30% by weight based on the total weight of the mixture including the positive electrode active material.

The binder is for keeping the positive electrode active material on the positive electrode current collector, and organically linking the positive electrode active materials to further increase binding force between them, and all binders known in the art may be used.

Example of the binder may include one type selected from the group consisting of fluorine resin-based binders including polyvinylidene fluoride (PVdF) or polytetrafluoroethylene (PTFE); rubber-based binders including styrene butadiene rubber (SBR), acrylonitrile-butadiene rubber or styrene-isoprene rubber; cellulose-based binders including carboxyl methyl cellulose (CMC), starch, hydroxypropyl cellulose or regenerated cellulose; polyalcohol-based binders; polyolefin-based binders including polyethylene or polypropylene; polyimide-based binders; polyester-based binders; and silane-based binders, or mixtures or copolymers of two or more types thereof.

The binder may be included in 0.5% by weight to 30% by weight based on the total weight of the mixture including the positive electrode active material. When the binder content is less than 0.5% by weight, physical properties of the positive electrode decline eliminating the active material and the conductor in the positive electrode, and when the content is greater than 30% by weight, a ratio of the active material and the conductor relatively decreases in the positive electrode reducing battery capacity.

The positive electrode may be prepared using the method described above, or may also be prepared using common methods known in the art. As a more specific example, the positive electrode may be prepared by preparing slurry by mixing a solvent, and, as necessary, additives such as a binder, a conductor and a filler to a positive electrode active material and stirring the result, then coating the slurry on a current collector made of a metal material, and compressing and drying the result.

Specifically, the binder is dissolved in a solvent for preparing slurry first, and then a conductor is dispersed thereinto. As the solvent for preparing the slurry, those capable of uniformly dispersing the positive electrode active material, the binder and the conductor and readily evaporating are preferably used, and typical examples thereof may include acetonitrile, methanol, ethanol, tetrahydrofuran, water, isopropyl alcohol and the like. Next, the positive electrode active material, or selectively together with the additives, is uniformly dispersed again in the conductor-dispersed solvent to prepare positive electrode slurry. The amounts of the solvent, the positive electrode active material, or, selectively, the additives included in the slurry do not carry an important meaning in the present application, and it is sufficient that the slurry has proper viscosity to be readily coated. The slurry prepared as above is coated on a current collector, and vacuum dried to form a positive electrode. The slurry may be coated on a current collector to a proper thickness depending on the slurry viscosity and the thickness of the positive electrode to form.

The coating may be conducted using methods commonly known in the art, and for example, the positive electrode active material slurry is distributed on an upper surface of one side of the positive electrode current collector, and uniformly dispersing the slurry using a doctor blade or the like. In addition thereto, the coating may be conducted using a method such as die casting, comma coating or screen printing.

The drying is not particularly limited, but may be conducted within 1 day in a vacuum oven of 50° C. to 200° C.

The negative electrode according to the present invention may be formed with a negative electrode current collector, and a negative electrode active material layer formed on one surface or both surfaces thereof. Alternatively, the negative electrode may be a lithium metal plate.

The negative electrode active material layer may include a negative electrode active material, and selectively, a conductor and a binder.

As the negative electrode active material, a material capable of reversibly intercalating or deintercalating lithium ions, a material capable of reversibly forming a lithium-containing compound by reacting with lithium ions, lithium metal or a lithium alloy may be used.

Examples of the material capable of reversibly intercalating or deintercalating lithium ions may include crystalline carbon, amorphous carbon or a mixture thereof.

Examples of the material capable of reversibly forming a lithium-containing compound by reacting with lithium ions may include tin oxide, titanium nitrate or silicon.

Examples of the lithium alloy may include alloys of lithium (Li) and metals selected from the group consisting of sodium (Na), potassium (K), rubidium (Rb), cesium (Cs), francium (Fr), beryllium (Be), magnesium (Mg), calcium (Ca), strontium (Sr), barium (Ba), radium (Ra), aluminum (Al) and tin (Sn).

As for constitutions of the current collector, the conductor, the binder and the like other than the negative electrode active material and a method for preparing a negative electrode, the materials, the methods and the like used in the positive electrode described above may be used.

The separator according to the present invention is a physical separator having a function of physically separating the positive electrode and the negative electrode, and is not particularly limited as long as it is used as a common separator, and those having an excellent electrolyte liquid moisture-containing ability while having low resistance for ion migration of the electrolyte liquid are particularly preferred.

In addition, the separator enables lithium ion transport between the positive electrode and the negative electrode while separating or insulating the positive electrode and the negative electrode from each other. Such a separator may be formed with porous, that is, 30% to 50% porosity, and non-conductive or insulating materials.

Specifically, porous polymer films, for example, porous polymer films prepared with a polyolefin-based polymer such as an ethylene homopolymer, a propylene homopolymer, an ethylene/butene copolymer, an ethylene/hexene copolymer and an ethylene/methacrylate copolymer may be used, or non-woven fabrics made of high melting point glass fiber or the like may be used. Among these, a porous polymer film is preferably used.

When using a polymer film as both a buffer layer and the separator, the amount of electrolyte liquid impregnation and ion conducting properties decline, and effects of reducing an overvoltage and improving capacity properties become insignificant. Meanwhile, when using a non-woven fabric material as the both, mechanical strength is not secured causing a battery short circuit problem. However, when using a film-type separator and a polymer non-woven fabric buffer layer together, mechanical strength may also be secured together with an effect of improving battery performance obtained by employing the buffer layer.

Preferably, in the present invention, an ethylene homopolymer (polyethylene) polymer film is used as the separator, and a polyimide non-woven fabric is used as the buffer layer. Herein, the polyethylene polymer film preferably has a thickness of 10 µm to 25 µm and porosity of 40% to 50%.

The electrolyte liquid according to the present invention is, as a non-aqueous electrolyte liquid including a lithium salt, formed with a lithium salt and a solvent. The electrolyte liquid has density of less than 1.5 g/cm$^3$. When the electrolyte liquid has density of 1.5 g/cm$^3$ or greater, the lithium-sulfur secondary battery is difficult to accomplish high energy density due to a weight increase in the electrolyte liquid.

The lithium salt is a material that may be readily dissolved in a non-aqueous organic solvent, and examples thereof may include one or more selected from the group consisting of LiCl, LiBr, LiI, LiClO$_4$, LiBF$_4$, LiB$_{10}$Cl$_{10}$, LiB(Ph)$_4$, LiC$_4$BO$_8$, LiPF$_6$, LiCF$_3$SO$_3$, LiCF$_3$CO$_2$, LiAsF$_6$, LiSbF$_6$, LiAlCl$_4$, LiSO$_3$CH$_3$, LiSO$_3$CF$_3$, LiSCN, LiC(CF$_3$SO$_2$)$_3$, LiN(CF$_3$SO$_2$)$_2$, LiN(C$_2$FsSO$_2$)$_2$, LiN(SO$_2$F)$_2$, chloroborane lithium, lower aliphatic carboxylic acid lithium, and lithium imide. In one specific embodiment of the present invention, the lithium salt may be preferably lithium imide such as LiTFSI.

The concentration of the lithium salt may be from 0.1 M to 8.0 M, preferably from 0.5 M to 5.0 M and more preferably from 1.0 to 3.0 M depending on various factors such as an accurate composition of the electrolyte liquid mixture, solubility of the salt, conductivity of the dissolved salt, charge and discharge conditions of a battery, a working temperature, and other factors known in the lithium secondary battery field. When the lithium salt concentration is less than the above-mentioned range, conductivity of the electrolyte liquid may decrease causing decline in the battery performance, and when the lithium salt concentration is greater than the above-mentioned range, viscosity of the electrolyte liquid increases leading to a decrease in the lithium ion (Li$^+$) mobility, and therefore, a proper concentration is preferably selected in the above-mentioned range.

The solvent includes a first solvent and a second solvent. The first solvent has a highest dipole moment per unit volume among the constituents included in 1% by weight or greater in the solvent, and accordingly, has high dipole moment and low viscosity. Using a solvent with a high dipole moment is effective in improving solid-state reactivity of sulfur, and such an effect may be obtained well when the solvent itself has low viscosity. In the present invention, the first solvent is classified by a DV$^2$ factor represented by the following Mathematical Formula 4.

$$DV^2 \text{ factor} = \gamma \times \frac{\mu}{DV} \qquad \text{[Mathematical Formula 4]}$$

In Mathematical Formula 4, DV is a dipole moment per unit volume (D·mol/L), µ is viscosity of the solvent (cP, 25° C.), and γ is 100 (constant).

According to the present invention, the DV$^2$ factor value may be 1.75 or less, and preferably 1.5 or less. Although a lower limit of the DV$^2$ factor value is not particularly limited in the present invention, the DV$^2$ factor value may be 0.1 or greater when considering actual driving of the lithium-sulfur secondary battery. When mixing a solvent having a DV$^2$ factor value of 1.75 or less such as the first solvent, battery performance does not decline even when using a positive electrode having low porosity and having a high loading amount of sulfur, a positive electrode active material, in a lithium-sulfur battery since functionality of an electrolyte liquid may be maintained the same.

In the present invention, the first solvent is not particularly limited in the type as long as it has the DV$^2$ factor value included in the above-mentioned range, but may include one or more types selected from the group consisting of propionitrile, dimethylacetamide, dimethylformamide, gamma-butyrolactone, triethylamine and 1-iodopropane.

The first solvent may be included in 1% by weight to 50% by weight, preferably in 5% by weight to 40% by weight and more preferably in 10% by weight to 30% by weight based on the total weight of the solvent forming the electrolyte liquid. When the solvent according to the present invention includes the first solvent in the above-described % by weight range, an effect of improving battery performance may be obtained even when using with a positive electrode having low porosity and a high loading amount of sulfur, a positive electrode active material.

The lithium-sulfur secondary battery of the present invention may be further classified by an NS factor combining the SC factor and the $DV^2$ factor. The NS factor is represented by the following Mathematical Formula 5.

$$NS \text{ factor} = \frac{DV^2 \text{ factor}}{SC \text{ factor}} \quad \text{[Mathematical Formula 5]}$$

In Mathematical Formula 5, the SC factor has the same value as defined in Mathematical Formula 2, and the $DV^2$ factor has the same value as defined in Mathematical Formula 4.

In the present invention, the NS factor value may be 3.5 or less, preferably 3.0 or less, and more preferably 2.7 or less. Although a lower limit of the NS factor value is not particularly limited in the present invention, the NS factor value may be 0.1 or greater when considering actual driving of the lithium-sulfur secondary battery. When the NS factor value is adjusted to be in the above-mentioned range, an effect of improving performance of the lithium-sulfur secondary battery may be more superior.

In the present invention, the second solvent is a fluorinated ether-based solvent. In order to control viscosity of an electrolyte liquid in the art, solvents such as dimethoxyethane and dimethyl carbonate have been used as a diluent, and when using such a solvent as a diluent, a battery including a high loading and low porosity positive electrode as in the present invention may not be driven. Accordingly, in the present invention, the second solvent is added with the first solvent in order to drive the positive electrode according to the present invention. The second solvent is not particularly limited in the type as long as it is a fluorinated ether-based solvent generally used in the art, but may include one or more types selected from the group consisting of 1H,1H,2'H,3H-decafluorodipropyl ether, difluoromethyl 2,2,2-trifluoroethyl ether, 1,2,2,2-tetrafluoroethyl trifluoromethyl ether, 1,1,2,3,3,3-hexafluoropropyl difluoromethyl ether, pentafluoroethyl 2,2,2-trifluoroethyl ether and 1H,1H, 2'H-perfluorodipropyl ether.

The second solvent may be included in 50% by weight to 99% by weight, preferably in 60% by weight to 95% by weight, and more preferably in 70% by weight to 90% by weight based on the total weight of the solvent forming the electrolyte liquid. When the solvent according to the present invention includes the second solvent in the above-described % by weight range, an effect of improving battery performance may be obtained even when using with a positive electrode having low porosity and a high loading amount of sulfur, a positive electrode active material, like the first solvent. When mixing the first solvent and the second solvent, the second solvent may be included in the electrolyte liquid in the same or more amount compared to the first solvent considering a battery performance improving effect. According to the present invention, the solvent may include the first solvent and the second solvent in a weight ratio of 1:1 to 1:9 and preferably 3:7 to 1:9 (first solvent:second solvent).

The non-aqueous electrolyte liquid for a lithium-sulfur battery of the present invention may further include a nitrate or nitrite-based compound as an additive. The nitrate or nitrite-based compound is effective in forming a stable film on the lithium electrode and enhancing charge and discharge efficiency. Such a nitrate or nitrite-based compound is not particularly limited in the present invention, however, one type selected from the group consisting of inorganic-based nitrate or nitrite compounds such as lithium nitrate ($LiNO_3$), potassium nitrate ($KNO_3$), cesium nitrate ($CsNO_3$), barium nitrate ($Ba(NO_3)_2$), ammonium nitrate ($NH_4NO_3$), lithium nitrite ($LiNO_2$), potassium nitrite ($KNO_2$), cesium nitrite ($CsNO_2$) and nitrite ammonium ($NH_4NO_2$); organic-base nitrate or nitrite compounds such as methyl nitrate, dialkyl imidazolium nitrate, guanidine nitrate, imidazolium nitrate, pyridinium nitrate, ethyl nitrite, propyl nitrite, butyl nitrite, pentyl nitrite and octyl nitrite; organic nitro compounds such as nitromethane, nitropropane, nitrobutane, nitrobenzene, dinitrobenzene, nitro pyridine, dinitropyridine, nitrotoluene and dinitrotoluene, and combinations thereof may be used, and preferably, lithium nitrate is used.

In addition, the non-aqueous electrolyte liquid may further include other additives with the purpose of improving charge and discharge properties, flame retardancy and the like. Examples of the additive may include pyridine, triethylphosphite, triethanolamine, cyclic ether, ethylenediamine, n-glyme, hexaphosphoric acid triamide, nitrobenzene derivatives, sulfur, quinoneimine dyes, N-substituted oxazolidinone, N,N-substituted imidazolidine, ethylene glycol dialkyl ether, ammonium salts, pyrrole, 2-methoxyethanol, aluminum trichloride, fluoroethylene carbonate (FEC), propene sultone (PRS), vinylene carbonate (VC) and the like.

The lithium-sulfur secondary battery of the present invention may be manufactured by disposing a separator between a positive electrode and a negative electrode to form an electrode assembly, placing the electrode assembly in a cylindrical battery case or an angular battery case, and then injecting an electrolyte thereto. Alternatively, the lithium-sulfur secondary battery of the present invention may also be manufactured by laminating the electrode assembly, impregnating the electrode assembly into an electrolyte, and placing the obtained result in a battery case and sealing the result.

In addition, the present invention provides a battery module including the lithium-sulfur secondary battery as a unit cell.

The battery module may be used as a power supply of medium to large-sized devices requiring high-temperature stability, long cycle properties and high capacity properties.

Examples of the medium to large-sized device may include power tools operated through receiving electric power by a battery motor; electric vehicles including electric vehicles (EV), hybrid electric vehicles (HEV), plug-in hybrid electric vehicles (PHEV) and the like; electric two-wheeled vehicles including electric bikes (e-bikes) and electric scooters (e-scooters); electric golf carts; systems for power storage, and the like, but are not limited thereto.

According to preferred one embodiment of the present invention, there is provided a lithium secondary battery including a positive electrode, a negative electrode, a separator and an electrolyte liquid, wherein, in the lithium secondary battery, an ED factor value represented by the following Mathematical Formula 1 is 850 or greater, $$ED \text{ factor} = V \times SC \text{ factor} \times \frac{C}{D} \quad \text{[Mathematical Formula 1]}$$

in Mathematical Formula 1, V is a discharge nominal voltage (V) for Li/Li$^+$, D is density (g/cm$^3$) of the electrolyte liquid, C is discharge capacity (mAh/g) when discharging at a 0.1 C rate, and the SC factor represented by the following Mathematical Formula 2 is 0.45 or greater, $$SC \text{ factor} = \alpha \times \frac{L}{P} \quad \text{[Mathematical Formula 2]}$$

in Mathematical Formula 2, P is porosity (%) of a positive electrode active material layer in the positive electrode, L is a mass of sulfur per unit area (mg/cm$^2$) of the positive electrode active material layer in the positive electrode, and α is 10 (constant), the positive electrode includes a sulfur-carbon composite including a carbon material satisfying a condition of an AC factor represented by the following Mathematical Formula 3 being 100 or greater:

$$AC \text{ factor} = 0.1 \times \text{specific area}(m^2/g) + 2 \times \text{conductivity}(S/cm @ 2000 \text{ kgf}) \quad \text{[Mathematical Formula 3]}$$

According to preferred another embodiment of the present invention, there is provided a lithium secondary battery including a positive electrode; a negative electrode; a separator; and an electrolyte liquid, wherein, in the lithium secondary battery, an ED factor value represented by the following Mathematical Formula 1 is 850 or greater, $$ED \text{ factor} = V \times SC \text{ factor} \times \frac{C}{D} \quad \text{[Mathematical Formula 1]}$$

in Mathematical Formula 1, V is a discharge nominal voltage (V) for Li/Li$^+$, D is density (g/cm$^3$) of the electrolyte liquid, C is discharge capacity (mAh/g) when discharging at a 0.1 C rate, and the SC factor represented by the following Mathematical Formula 2 is 0.45 or greater, $$SC \text{ factor} = \alpha \times \frac{L}{P} \quad \text{[Mathematical Formula 2]}$$

in Mathematical Formula 2, P is porosity (%) of a positive electrode active material layer in the positive electrode, L is a mass of sulfur per unit area (mg/cm$^2$) of the positive electrode active material layer in the positive electrode, and a is 10 (constant), the positive electrode includes a sulfur-carbon composite including a dot-type carbon material, the electrolyte liquid includes a solvent and a lithium salt, the solvent includes a first solvent in which a DV$^2$ factor value represented by the following Mathematical Formula 4 is 1.75 or less; and a second solvent that is a fluorinated ether-based solvent:

$$DV^2 \text{ factor} = \gamma \times \frac{\mu}{DV} \quad \text{[Mathematical Formula 4]}$$

herein, DV is a dipole moment per unit volume (D·mol/L), μ is viscosity of the solvent (cP, 25° C.), and γ is 100 (constant).

In addition, as in the above-described embodiment, the ED factor value may have a larger value when the positive electrode of the lithium secondary battery includes a dot-type carbon material, compared to when including a different type of carbon material that is not a dot-type carbon material such as a linear carbon material or a planar carbon material. When the positive electrode of the lithium secondary battery includes a dot-type carbon material, the ED factor may be preferably 1350 or greater, 1400 or greater, or 1450 or greater.

Hereinafter, preferred examples will be provided in order to illuminate the present invention, however, the following examples are for illustrative purposes only, and it will be obvious to those skilled in the art that various changes and modifications may be made within the category and technological ideas of the present invention, and such changes and modifications also fall within the scope of the attached claims.

Experiments According to Positive Electrode Active Material Layer Porosity and Mass of Sulfur Per Unit Area Preparation Example 1: Preparation of Sulfur-Carbon Composite Active Material Carbon nanotubes (AC factor=156) having a specific surface area of 319 m$^2$/g and electrical conductivity (value obtained by converting a powder resistance value measured while applying a pressure of 2000 kgf using a powder resistivity measurement system (HanTech Co., Ltd.) to conductivity) of 62 S/cm and sulfur (S$_8$) were evenly mixed in a weight ratio of 1:3, and after grinding the result by mortar mixing, the result was left for 30 minutes in a 155° C. oven to prepare a sulfur-carbon composite.

Preparation Example 2: Preparation of Sulfur-Carbon Composite Active Material

Carbon black (AC factor=192) having a specific surface area of 1400 m$^2$/g and electrical conductivity (value obtained by converting a powder resistance value measured while applying a pressure of 2000 kgf using a powder resistivity measurement system (HanTech Co., Ltd.) to conductivity) of 26 S/cm and sulfur (Sa) were evenly mixed in a weight ratio of 1:3, and after grinding the result by mortar mixing, the result was left for 30 minutes in a 155° C. oven to prepare a sulfur-carbon composite.

Preparation Example 3: Preparation of Sulfur-Carbon Composite Active Material

Carbon nanotubes (AC factor=100) having a specific surface area of 184 m$^2$/g and electrical conductivity (value obtained by converting a powder resistance value measured while applying a pressure of 2000 kgf using a powder resistivity measurement system (HanTech Co., Ltd.) to conductivity) of 41 S/cm and sulfur (Sa) were evenly mixed in a weight ratio of 1:3, and after grinding the result by mortar mixing, the result was left for 30 minutes in a 155° C. oven to prepare a sulfur-carbon composite.

Preparation Example 4: Preparation of Sulfur-Carbon Composite Active Material

Carbon nanotubes (AC factor=113) having a specific surface area of 191 m$^2$/g and electrical conductivity (value obtained by converting a powder resistance value measured while applying a pressure of 2000 kgf using a powder resistivity measurement system (HanTech Co., Ltd.) to conductivity) of 47 S/cm and sulfur (Sa) were evenly mixed in a weight ratio of 1:3, and after grinding the result by mortar mixing, the result was left for 30 minutes in a 155° C. oven to prepare a sulfur-carbon composite.

Comparative Preparation Example 1: Preparation of Sulfur-Carbon Composite Active Material Carbon nanotubes (AC factor=72) having a specific surface area of 58 $m^2/g$ and electrical conductivity (value obtained by converting a powder resistance value measured while applying a pressure of 2000 kgf using a powder resistivity measurement system (HanTech Co., Ltd.) to conductivity) of 33 S/cm and sulfur (Sa) were evenly mixed in a weight ratio of 1:3, and after grinding the result by mortar mixing, the result was left for 30 minutes in a 155° C. oven to prepare a sulfur-carbon composite.

Preparation Examples 5 to 8 and Comparative Preparation Example 2: Preparation of Positive Electrode for Lithium-Sulfur Battery A composition for forming an active material layer was prepared by mixing 88% by weight of the sulfur-carbon composite prepared in each of Preparation Examples 1 to 4 or 88% by weight of the sulfur-carbon composite prepared in Comparative Preparation Example 1, 5% by weight of denka black as a conductor, and 7% by weight of SBR and CMC as a binder with distilled water.

The composition was coated on an aluminum current collector in an amount of 6 $mg/cm^2$ to prepare a positive electrode, porosity of the positive electrode active material layer and a mass of sulfur per unit area of the positive electrode active material layer were measured, and based on the data, an SC factor value was calculated and shown in the following Table 1.

Herein, the porosity of the positive electrode active material layer was calculated by measuring electrode weight and electrode thickness in the prepared positive electrode (using TESA-µHITE device manufactured by TESA).

TABLE 1

| | Used Sulfur-Carbon Composite | Porosity (%) of Positive Electrode Active Material layer | Mass of Sulfur per Unit Area ($mg/cm^2$) of Positive Electrode Active Material Layer | SC factor |
|---|---|---|---|---|
| Preparation Example 5 | Preparation Example 1 | 60 | 5.34 | 0.89 |
| Preparation Example 6 | Preparation Example 2 | 60 | 4.5 | 0.75 |
| Preparation Example 7 | Preparation Example 3 | 60 | 5.34 | 0.89 |
| Preparation Example 8 | Preparation Example 4 | 60 | 5.34 | 0.89 |
| Comparative Preparation Example 2 | Comparative Preparation Example 1 | 60 | 4.56 | 0.76 |

Comparative Preparation Example 3: Preparation of Positive Electrode for Lithium-Sulfur Battery A composition for forming a positive electrode active material layer was prepared by mixing water as a solvent, sulfur, Super-P (SP), a conductor and a binder using a ball mill. Herein, denka black was used as the conductor, a mixed type binder of SBR and CMC was used as the binder, and the mixing ratio was employed such that the sulfur and the SP (weight ratio 9:1):the conductor:the binder were 90:10:10. The prepared composition for forming a positive electrode active material layer was coated on an aluminum current collector, and dried to prepare a positive electrode (energy density of positive electrode: 6.18 $mAh/cm^2$). In the prepared positive electrode, porosity of the positive electrode active material layer was 75%, a mass of sulfur per unit area of the positive electrode active material layer was 3.1 $mg/cm^2$, and an SC factor value calculated based thereon was 0.41.

Examples 1 to 4: Manufacture of Lithium-Sulfur Secondary Battery

Using each of the positive electrodes prepared in Preparation Examples 5 to 8, lithium foil having a thickness of 150 µm as a negative electrode, and polyethylene having a thickness of 20 µm and porosity of 45% as a separator, the positive electrode and the negative electrode were placed to face each other, and the separator was provided therebetween to prepare an electrode assembly.

Subsequently, the electrode assembly was placed inside a case, and an electrolyte liquid was injected thereto to manufacture a lithium-sulfur secondary battery.

Herein, the electrolyte liquid was prepared by dissolving lithium bis(trifluoromethylsulfonyl)imide (LiTFSI) with a 3 M concentration in an organic solvent, and as the organic solvent, a mixed solvent obtained by mixing propionitrile (first solvent) and 1H,1H,2'H,3H-decafluorodipropyl ether (second solvent) in a 3:7 weight ratio was used. A dipole moment per unit volume was 97.1 D·mol/L in the first solvent, and viscosity of the solvent was 0.38 cP (25° C.). A $DV^2$ factor value calculated based thereon was 0.39. Herein, the solvent viscosity was measured using a LVDV2T-CP viscometer of BROOKFIELD AMETEK, Inc.

Comparative Example 1: Manufacture of Lithium-Sulfur Secondary Battery

A lithium-sulfur secondary battery was manufactured in the same manner as in Example 1 except that the positive electrode prepared in Comparative Preparation Example 2 was used.

Comparative Example 2: Manufacture of Lithium-Sulfur Secondary Battery

A lithium-sulfur secondary battery was manufactured in the same manner as in Example 1 except that the positive electrode prepared in Comparative Preparation Example 3 was used.

Comparative Example 3: Manufacture of Lithium-Sulfur Secondary Battery

A lithium-sulfur secondary battery was manufactured in the same manner as in Comparative Example 1 except that, by changing the electrolyte liquid preparation condition, an electrolyte liquid using dimethoxyethane (DME) was used instead of 1H,1H,2'H,3H-decafluorodipropyl ether as the second solvent.

Comparative Example 4: Manufacture of Lithium-Sulfur Secondary Battery

A lithium-sulfur secondary battery was manufactured in the same manner as in Comparative Example 1 except that, by changing the electrolyte liquid preparation condition, propylene carbonate having a dipole moment per unit volume of 96.13 D·mol/L, solvent viscosity of 1.71 cP, and a $DV^2$ factor value calculated based thereon of 1.77 was used instead of propionitrile as the first solvent.

The conditions of Examples 1 to 4 and Comparative Examples 1 to 4 are summarized and shown in the following Table 2.

TABLE 2

| | Electrolyte Liquid Composition | SC factor | $DV^2$ factor | NS factor |
|---|---|---|---|---|
| Example 1 | First Electrolyte Liquid Composition[1] | 0.89 | 0.39 | 0.44 |
| Example 2 | | 0.75 | 0.39 | 0.52 |
| Example 3 | | 0.89 | 0.39 | 0.44 |
| Example 4 | | 0.89 | 0.39 | 0.44 |
| Comparative Example 1 | | 0.76 | 0.39 | 0.51 |
| Comparative Example 2 | | 0.41 | 0.39 | 0.95 |
| Comparative Example 3 | Second Electrolyte Liquid Composition[2] | 0.6 | 0.39 | 0.65 |
| Comparative Example 4 | Third Electrolyte Liquid Composition[3] | 0.6 | 1.77 | 2.95 |

[1]First electrolyte liquid composition = propionitrile:1H,1H,2'H,3H-decafluorodipropyl ether (3:7, w/w) solvent, 3.0M LiTFSI
[2]Second electrolyte liquid composition = propionitrile:dimethoxyethane (3:7, w/w) solvent, 3.0M LiTFSI
[3]Third electrolyte liquid composition = propylene carbonate:1H,1H,2'H,3H-decafluorodipropyl ether (3:7, w/w) solvent, 3.0M LiTFSI

Experimental Example 1: Battery Performance Evaluation (Evaluation on Initial Discharge Capacity)

For each of the lithium-sulfur secondary batteries manufactured in Examples 1 to 4 and Comparative Examples 1 to 4, capacity was measured from 1.0 V to 3.6 V using a charge and discharge measuring device.

Based on the experiments, the lithium-sulfur secondary batteries of Examples 1 to 4 exhibited superior initial discharge capacity compared to the lithium-sulfur secondary batteries manufactured in Comparative Examples 1 to 4.

Experimental Example 2: Battery Performance Evaluation (Measurement of ED Factor Value)

ED factor values of the lithium-sulfur secondary batteries according to Examples 1 to 4 and Comparative Examples 1 to 4 were measured using a charge and discharge measuring device (LAND CT-2001A, Wuhan, China) while conducting charge-discharge at a rate of 0.1 C during initial 2.5 cycles of discharge-charge-discharge-charge-discharge, then conducting 3 cycles of charge-discharge at 0.2 C, and then conducting charge-discharge up to 50 cycles at rates of 0.3 C (charge) and 0.5 C (discharge), and the results are shown in the following Table 3.

TABLE 3

| | Electrolyte Liquid Composition | SC factor | ED factor |
|---|---|---|---|
| Example 1 | First Electrolyte Liquid Composition[1] | 0.89 | 1895 |
| Example 2 | | 0.75 | 1740 |
| Example 3 | | 0.89 | 1751 |
| Example 4 | | 0.89 | 1764 |
| Comparative Example 1 | | 0.76 | 28 |
| Comparative Example 2 | | 0.41 | 802 |
| Comparative Example 3 | Second Electrolyte Liquid Composition[2] | 0.6 | 1115 |
| Comparative Example 4 | Third Electrolyte Liquid Composition[3] | 0.6 | 1074 |

[1]First electrolyte liquid composition = propionitrile:1H,1H,2'H,3H-decafluorodipropyl ether (3:7, w/w) solvent, 3.0M LiTFSI
[2]Second electrolyte liquid composition = propionitrile:dimethoxyethane (3:7, w/w) solvent, 3.0M LiTFSI
[3]Third electrolyte liquid composition = propylene carbonate:1H,1H,2'H,3H-decafluorodipropyl ether (3:7, w/w) solvent, 3.0M LiTFSI According to Table 3, the lithium-sulfur secondary batteries according to Examples 1 to 4 were able to have a relatively larger ED factor value compared to the lithium-sulfur secondary battery having the second electrolyte liquid composition, the third electrolyte liquid composition or having an SC factor of 0.41 or less. This means that the lithium-sulfur secondary battery according to the present invention was capable of obtaining higher energy density that was not able to be obtained in existing lithium-sulfur secondary batteries.

Experiments Depending on Carbon Material Shape and Electrolyte Liquid Type

Example 5

(1) Preparation of Positive Electrode

After mixing sulfur and ketjen black, a dot-type carbon material, in a weight ratio of 70:30, the result was heat treated for 30 minutes at 155° C. to prepare a sulfur-carbon composite.

90% by weight of the sulfur-carbon composite, 5% by weight of styrene butadiene rubber/carboxymethyl cellulose (SBR/CMC 7:3) as a binder, and 5% by weight of denka black as a conductor were mixed, and dissolved in water to prepare positive electrode slurry having a concentration (concentration based on solid content) of 20%.

The positive electrode slurry was coated on an aluminum current collector to form a positive electrode active material layer, and the layer was dried and rolled to prepare a positive electrode. In the prepared positive electrode, porosity of the positive electrode active material layer calculated based on the electrode weight and the electrode thickness (using a TESA-pHITE device manufactured by TESA) was 63%, and a mass of sulfur per unit area of the positive electrode active material layer was 4.6 mg/cm$^2$. An SC factor value calculated based thereon was 0.73.

(2) Manufacture of Lithium-Sulfur Secondary Battery

The positive electrode prepared using the above-described method, and a negative electrode were placed to face each other, and a polyethylene separator having a thickness of 20 μm and porosity of 45% was provided between the positive electrode and the negative electrode.

After that, an electrolyte liquid was injected into the case to manufacture a lithium-sulfur secondary battery. Herein, the electrolyte liquid prepared by dissolving lithium bis (trifluoromethylsulfonyl)imide (LiTFSI) with a 3 M concentration in an organic solvent, and as the organic solvent, a mixed solvent obtained by mixing propionitrile (first solvent) and 1H,1H,2'H,3H-decafluorodipropyl ether (second solvent) in a 3:7 weight ratio was used. A dipole moment per unit volume (DV) was 97.1 D·mol/L in the first solvent, and viscosity (p) of the solvent was 0.38 cP. A $DV^2$ factor value calculated based thereon was 0.39.

Example 6

A lithium-sulfur secondary battery was manufactured in the same manner as in Example 5 except that a positive electrode was prepared such that porosity of a positive electrode active material layer was 55%, a mass of sulfur per unit area of the positive electrode active material layer was 5.0 mg/cm$^2$, and an SC factor value calculated based thereon was 0.91.

Comparative Example 5

A lithium-sulfur secondary battery was manufactured in the same manner as in Example 5 except that, by changing a type of the organic solvent used in the electrolyte liquid, a solvent obtained by mixing dioxolane (DOL) (first solvent) and dimethoxyethane (DME) (second solvent) in a weight ratio of 5:5 was used, and LiNO$_3$ was added in 1% by weight to the electrolyte liquid as an additive. A dipole moment per unit volume (DV) was 33.66 D·mol/L in the first solvent, and viscosity (p) of the solvent was 0.7 cP. A $DV^2$ factor value calculated based thereon was 2.07.

In addition, the positive electrode preparation condition was changed such that porosity of the positive electrode active material layer was 70%, a mass of sulfur per unit area of the positive electrode active material layer was 4.7 mg/cm$^2$, and an SC factor value calculated based thereon was 0.67.

Comparative Example 6

A lithium-sulfur secondary battery was manufactured in the same manner as in Comparative Example 5 except that, as the carbon material used for preparing a sulfur-carbon composite, CNT that is not a dot-type carbon material was used to prepare the sulfur-carbon composite.

Comparative Example 7

A lithium-sulfur secondary battery was manufactured in the same manner as in Comparative Example 5 except that, as the carbon material used for preparing a sulfur-carbon composite, CNT that is not a dot-type carbon material was used to prepare the sulfur-carbon composite.

In addition, the positive electrode preparation condition was changed such that porosity of the positive electrode active material layer was 65%, a mass of sulfur per unit area of the positive electrode active material layer was 4.6 mg/cm$^2$, and an SC factor value calculated based thereon was 0.71.

Experimental Example 3

When preparing the positive electrode in Example 5, an occurrence of detachment of the positive electrode before and after rolling was observed.

The FIGURE shows an image of the positive electrode before and after rolling in preparing the positive electrode in Example 5.

When referring to the FIGURE, it was identified that, when preparing a positive electrode using a sulfur-carbon composite prepared from a dot-type carbon material, positive electrode detachment did not occur before and after rolling.

Experimental Example 4

Conditions of the positive electrodes and the secondary batteries each manufactured in the examples and the comparative examples are summarized and shown in the following Table 4.

Performance of the batteries manufactured in the examples and the comparative examples was evaluated using a charge and discharge measuring device (LAND CT-2100A, Wuhan, China). Battery performance was evaluated by conducting charge and discharge at a rate of 0.1 C, and for the first discharge result, an ED factor was calculated as defined in Mathematical Formula 1. The calculated results are shown in the following Table 4.

TABLE 4

| | Electrolyte Liquid | SC factor | $DV^2$ factor | NS factor | ED factor |
|---|---|---|---|---|---|
| Comparative Example 5 | Fourth Electrolyte Liquid[4] | 0.67 | 2.07 | 3.09 | 388 |
| Comparative Example 6 | | 0.67 | 2.07 | 3.09 | 935 |
| Comparative Example 7 | Fifth Electrolyte Liquid[5] | 0.71 | 0.39 | 0.55 | 1342 |
| Example 5 | | 0.73 | 0.39 | 0.53 | 1498 |
| Example 6 | | 0.91 | 0.39 | 0.43 | 1678 |

[4]Fourth electrolyte liquid: DOL:DME (5:5, v/v), 1.0M LiTFSI, 1.0 wt % LiNO$_3$ 1 wt %
[5]Fifth electrolyte liquid: propionitrile:1H,1H,2'H,3H-decafluorodipropyl ether (3:7, w/w), 3.0M LiTFSI When referring to Table 4, it was seen that, when using the fourth electrolyte liquid, Comparative Example 5 using a dot-type carbon material had a lower ED factor compared to Comparative Example 6 using CNT.

In addition, when using the fifth electrolyte liquid, Example 5 using a dot-type carbon material had a higher ED factor compared to Comparative Example 7 using a linear carbon material.

Through such results, it was seen that the sulfur-carbon composite using a dot-type carbon material accomplished more effective performance in the fifth electrolyte liquid compared to the sulfur-CNT composite using CNT, a linear carbon material.

In addition, it was seen that the secondary battery including the sulfur-carbon composite using a dot-type carbon material had a higher ED factor value even under a condition of high SC factor (~0.91, Example 6).

The invention claimed is:
1. A lithium secondary battery comprising:
a positive electrode comprising a positive electrode active material layer;
a negative electrode;
a separator; and
an electrolyte liquid,
wherein the lithium secondary battery has an ED factor value represented by the following Mathematical Formula 1 of 850 or greater and 10,000 or less:

$$ED \text{ factor} = V \times SC \text{ factor} \times \frac{C}{D} \quad \text{[Mathematical Formula 1]}$$

in Mathematical Formula 1, V is a discharge nominal voltage (V) for Li/Li$^+$, D is a density (g/cm$^3$) of the electrolyte liquid, C is a discharge capacity (mAh/g) of the lithium secondary battery when discharging at a 0.1 C rate, and the SC factor is represented by the following Mathematical Formula 2, the SC factor being 0.45 or greater and 4.5 or less:

$$SC \text{ factor} = \alpha \times \frac{L}{P} \quad \text{[Mathematical Formula 2]}$$

in Mathematical Formula 2, P is porosity (%) of the positive electrode active material layer, L is a mass of sulfur per unit area (mg/cm$^2$) of the positive electrode active material layer, and α is 10, wherein the SC factor defines the relationship between α, P, and L; and further wherein the positive electrode comprises a sulfur-carbon composite comprising a carbon material satisfying a condition of an AC factor represented by the following Mathematical Formula 3 being 100 or greater and 1,000 or less:

AC factor=0.1×specific area(m$^2$/g)+2×conductivity(S/cm@2000 kgf)     [Mathematical Formula 3]

in Mathematical Formula 3, specific area is a specific surface area of the carbon material, and conductivity is electrical conductivity obtained by converting a powder resistance value measured while applying a pressure of 2000 kgf to the carbon material to conductivity, wherein the electrolyte liquid comprises a solvent and a lithium salt, and the solvent comprises a first solvent in which a DV$^2$ factor value represented by the following Mathematical Formula 4 is 0.1 or greater and 1.75 or less and a second solvent that is a fluorinated ether-based solvent:

$$DV^2 \text{ factor} = \gamma \times \frac{\mu}{DV} \quad \text{[Mathematical Formula 4]}$$

in Mathematical Formula 4,
DV is a dipole moment per unit volume (D·mol/L);
μ is viscosity of the solvent (cP, 25° C.); and
γ is 100,
wherein the DV$^2$ factor defines the relationship between μ, γ, and DV, and
wherein the positive electrode comprises a dot-type carbon material.

2. The lithium secondary battery of claim 1, wherein the carbon material has a specific surface area of 100 m$^2$/g to 4500 m$^2$/g.

3. The lithium secondary battery of claim 1, wherein the carbon material has a pore volume of 0.8 cm$^3$/g to 5 cm$^3$/g.

4. The lithium secondary battery of claim 1, wherein electrical conductivity obtained by converting a powder resistance value measured while applying a pressure of 2000 kgf to the carbon material to conductivity is from 10 S/cm to 100 S/cm.

5. The lithium secondary battery of claim 1, wherein the dot-type carbon material comprises one or more selected from the group consisting of carbon black, ketjen black, denka black, acetylene black, channel black, furnace black, lamp black and thermal black.

6. The lithium secondary battery of claim 1, wherein the first solvent comprises one or more selected from the group consisting of propionitrile, dimethylacetamide, dimethylformamide, gamma-butyrolactone, triethylamine and 1-iodopropane.

7. The lithium secondary battery of claim 1, wherein the second solvent comprises one or more selected from the group consisting of 1H, 1H,2'H,3H-decafluorodipropyl ether, difluoromethyl 2,2,2-trifluoroethyl ether, 1,2,2,2-tetrafluoroethyl trifluoromethyl ether, 1,1,2,3,3,3-hexafluoropropyl difluoromethyl ether, pentafluoroethyl 2,2,2-trifluoroethyl ether and 1H, 1H,2'H-perfluorodipropyl ether.

8. The lithium secondary battery of claim 1, wherein the first solvent is present in the solvent in an amount of 1% by weight to 50% by weight based on a total weight of the solvent.

9. The lithium secondary battery of claim 1, wherein the second solvent is present in the solvent in an amount of 50% by weight to 99% by weight based on a total weight of the solvent.

10. The lithium secondary battery of claim 1, wherein the first solvent and the second solvent are present in the solvent in a weight ratio of 3:7 to 1:9.

11. The lithium secondary battery of claim 1, wherein, in the lithium secondary battery, an NS factor value represented by the following Mathematical Formula 5 is 3.5 or less:

$$NS \text{ factor} = \frac{DV^2 \text{ factor}}{SC \text{ factor}} \quad \text{[Mathematical Formula 5]}$$

in Mathematical Formula 5,
the SC factor has the same value as defined in Mathematical Formula 2, and the DV$^2$ factor has the same value as defined in Mathematical Formula 4,
wherein the NS factor defines the relationship between the DV$^2$ factor and the SC factor.

* * * * *